Sept. 28, 1948.  P. ROMANO  2,450,358
LINE TIGHTENER AND FASTENER
Filed Nov. 2, 1945
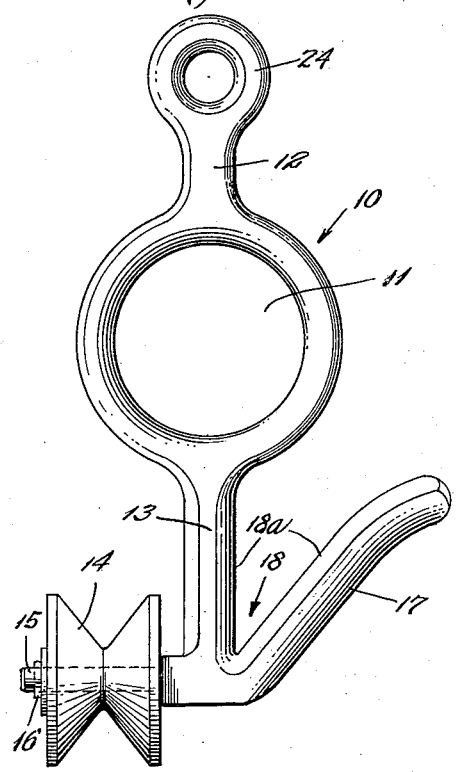
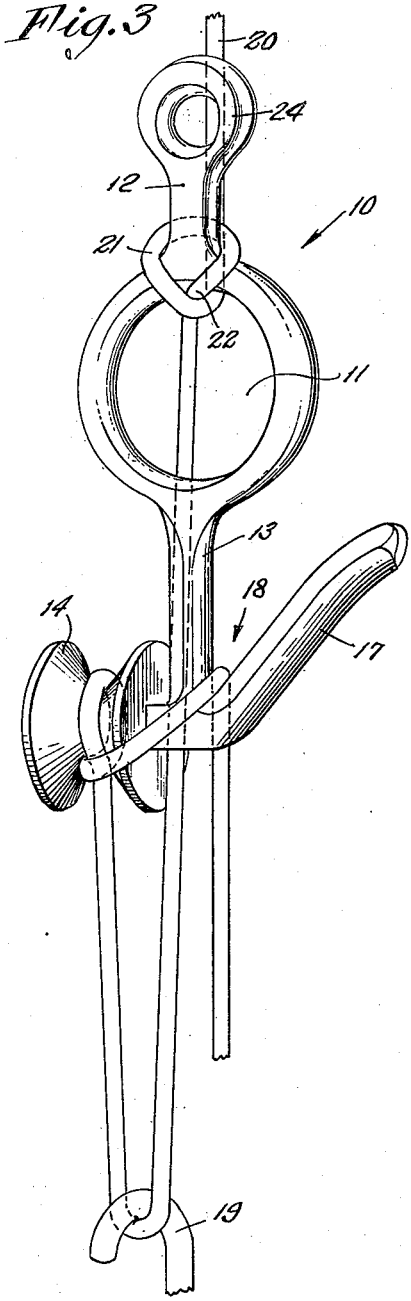
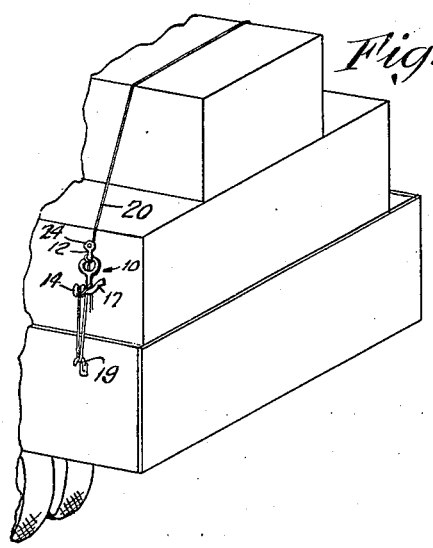
INVENTOR
Pasquale Romano
BY Johnson and Kline
ATTORNEYS Patented Sept. 28, 1948

2,450,358

UNITED STATES PATENT OFFICE 2,450,358

LINE TIGHTENER AND FASTENER

Pasquale Romano, Norwalk, Conn.

Application November 2, 1945, Serial No. 626,341

3 Claims. (Cl. 24—115)

This invention relates to a novel line manipulating device and particularly to a line tightener and fastening means.

An object of the invention is to provide a strong, rugged device which may be quickly and efficiently secured to or otherwise associated with a line to permit the line secured thereto to be drawn taut and fastened.

A feature of the device of the present invention is the ease with which the novel device may be associated with the line to enable the line to be drawn tightly and secured in taut relation with a minimum of effort.

A further feature of the present invention resides in the simplicity of design requiring a minimum of parts, all of which can be readily manufactured without a substantial amount of machining operations.

The device of the present invention is particularly well suited for use in connection with the securing of loads to trucks wherein lines are secured to one side of the truck to extend over the load and be secured at the other side.

With the device of the present invention these lines may be quickly and easily secured in place and drawn taut or released with a minimum of time and effort, thus effecting a great saving where the load must be handled a number of times during loading and unloading of the truck.

Because of its simple and rugged construction the device of the present invention may have numerous other uses wherein it is desired to draw a line taut and hold it in such condition.

Other features and advantages will be apparent from the specification and claims when considered in connection with the drawings in which:

Figure 1 is a plan view of the device.

Fig. 2 shows the device applied to a line for securing a load on a truck, and

Fig. 3 is a detailed view of the device as applied in Fig. 2.

As shown in the drawings, the device of the present invention comprises a body 10 having an aperture 11 therein and shanks 12 and 13 extending above and below the aperture. The aperture is of sufficient size to receive a loop of the line and the shank 12 is long enough to hold the loop of the line after it is passed thereover as shown in Fig. 2. The upper end of the shank 12 may be provided with an eyelet 24 for receiving a hook or other mounting means should it be desired to hang or otherwise secure the device in place.

The shank 13 extending below the aperture 11 is provided with a roller or pulley 14 rotatably mounted on a shaft 15 extending from the side of the shank adjacent the lower end thereof. The roller is secured to the shaft 15 for rotation thereon by a cotter pin 16 or other equivalent means. Preferably, the shaft is unsupported at one end so that the line can quickly and unobstructedly be carried around the roller. Projecting upwardly from the other side of shank 13 at an angle thereto is an arm 17. This arm, together with the shank, forms a V notch 18 for biting into the rope or line when the same is drawn therein. It will be noted that the arm flares outwardly and with the circular portion of the body and shank forms a throat for quick insertion of the line. The edges of the shank and arm facing the V notch are tapered at 18a to provide a relatively sharp biting surface for engaging the line as it leaves the roller to cooperate therewith to anchor the line.

Preferably, the shank 13 is of such a length as to space the roller and arm from the apertured body portion to permit the line to be manipulated with respect thereto for rapid and unobstructed operation thereabout.

The device of the present invention can be readily manufactured because of its simplicity. The body, shanks, shaft, roller and arms may be made separately of suitable stampings or forgings and assembled. However, it is preferred to make the body, shanks, arm and shaft as an integral casting and the roller as a separate casting. The only assembly would involve the mounting of the roller on the shaft. Such a device would require a minimum of machining and would be of a sturdy and rigid construction.

If required, the roller may be provided with suitable bearings and lubrication to insure its free rotation under load during a line tightening or a stretching operation.

The device of the present invention while having many uses will be explained in connection with Figs. 2 and 3 as applied to a line for fastening a load to a truck.

As is usually the case, trucks are provided with a hook not shown mounted on the side thereof to which one end of the line is secured. The line is then thrown over the truck and secured to a similar hook 19 on the other side. However, heretofore difficulty has been encountered in adequately drawing the line tight and securing it. The device of the present invention may be used in this connection for tightening and securing the line over the truck.

The portion of the line 20 coming over the truck has a loop 21 formed therein, which loop is passed through the aperture 11 and given a twist and the twisted loop is inserted over the shank 12. This anchors the portion 22 of the line to the body with a clamping action that increases as the pull on the line and device increases. The end portion of the line is led down around the hook 19 and back up over and around the pulley 14. By drawing on the line passing over the pulley, the line 20, which is anchored to the device at the portion 22 of the loop about the shank, is pulled taut over the load and is held in this condition when the end is carried into the V notch 18 to be firmly secured thereby against casual removal.

With the device of the present invention, therefore, a great saving in time and effort is accomplished in fastening down a load on a truck since a minimum of operations is required to tighten the line and lock the end thereof in place.

By suitably proportioning the elements of the device it may be made capable of operation with lines of a wide variety of sizes and materials.

The device of the present invention, because of the relation of the elements thereof, may be used also for tightening or stretching lines, for other purposes, for stretching fences and for many other functions in which a line or the like is used as an element of the operation.

Variations and modifications may be made within the scope of this invention and portions of the improvements may be used without others.

I claim:

1. A line tightener and fastener comprising a body having a line-receiving aperture intermediate the ends and opposed shanks projecting from each end, an eyelet at the end of one shank, and, adjacent the end of the other shank, a line-receiving roller disposed on one side thereof and an angularly disposed arm on the other side of the shank forming a V-shaped notch with the shank.

2. A line tightener and fastener comprising a body having an enlargement provided with a line-receiving aperture disposed intermediate the ends thereof; opposed shanks extending from the body; a shaft disposed adjacent the end of one of the shanks on one side thereof and having a free end projecting therefrom; a line tightening roller mounted for rotation on the shaft; and a V-shaped line locking notch disposed on the side of the shank opposite the roller and adjacent thereto.

3. A device of the class described comprising a body having an aperture therein to receive a loop of line and a shank extending therefrom and over which the loop is passed to anchor the line thereto, and a second opposed shank extending from the body and having a line-receiving roller and a line-receiving notch adjacent the end thereof to receive and lock the line thereto.

PASQUALE ROMANO.

REFERENCES CITED

The following references are of record in the file of this patent:

UNITED STATES PATENTS

| Number | Name | Date |
| --- | --- | --- |
| 325,136 | Weigel et al. | Aug. 25, 1885 |
| 338,159 | Kohn | Mar. 16, 1886 |
| 794,728 | Minetti | July 18, 1905 |
| 1,961,081 | Schrader | May 29, 1934 |